May 26, 1970 V. M. BERGER 3,514,301
COOKING UNIT
Filed June 4, 1968
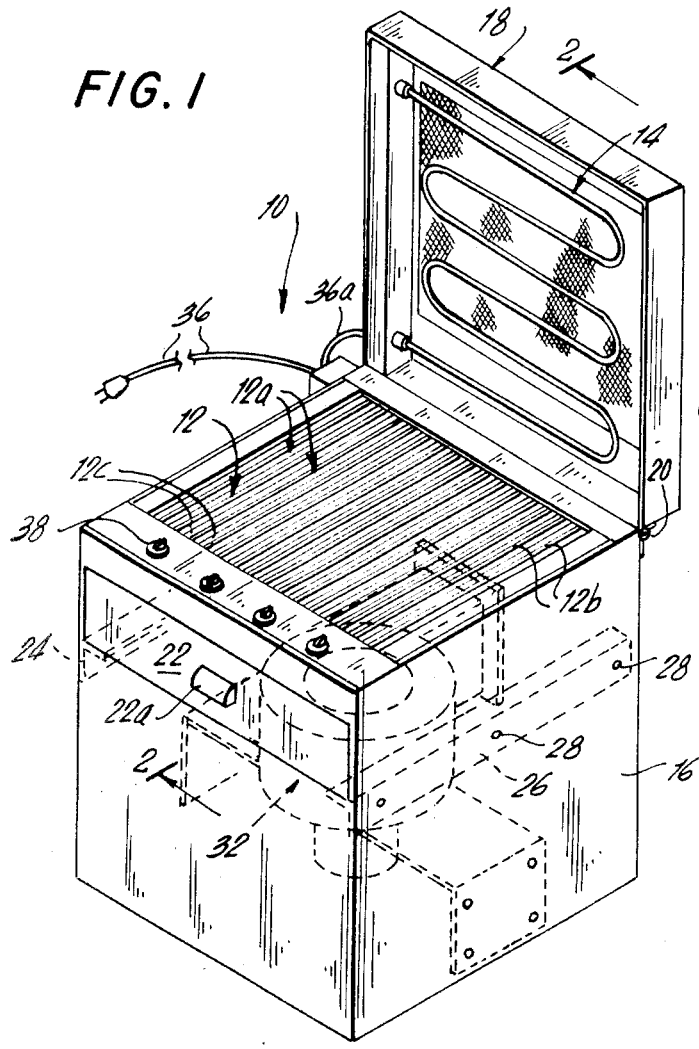
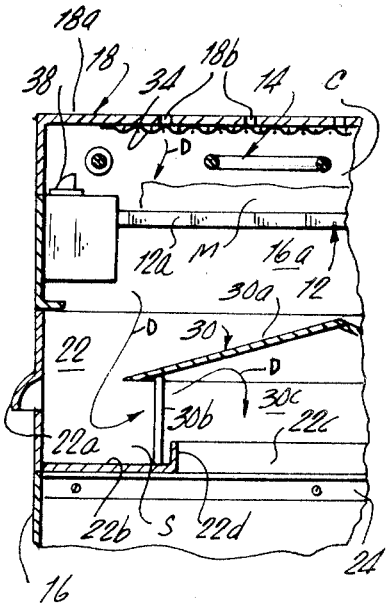
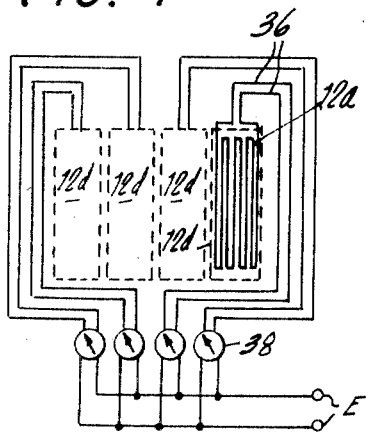
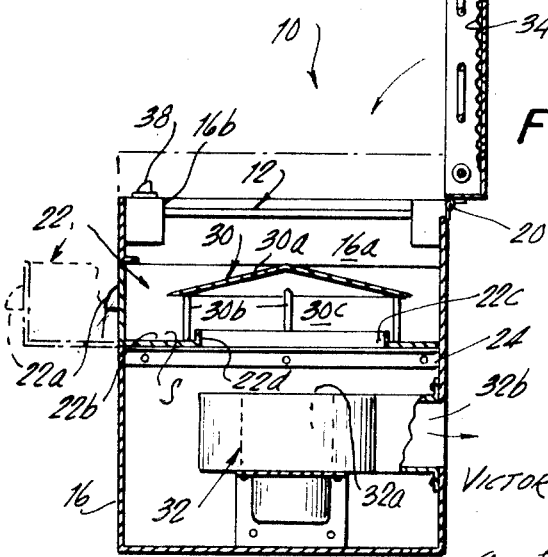
INVENTOR.
VICTOR M. BERGER
Amster & Rothstein
ATTORNEYS

United States Patent Office 3,514,301
Patented May 26, 1970

3,514,301
COOKING UNIT
Victor M. Berger, 200—17 50th Ave.,
Bayside, N.Y. 11364
Filed June 4, 1968, Ser. No. 734,305
Int. Cl. A47j *37/06*
U.S. Cl. 99—390        2 Claims

ABSTRACT OF THE DISCLOSURE

A cooking unit uniquely employing several combined techniques of heat transfer to efficiently cook foods, namely, a conduction heat source which actually supports the food during the cooking interval and, located in a clearance position above the food, a radiation and convection heat source. The latter heat source is rendered effective by a downdraft which, in addition to providing numerous noteworthy advantages and benefits, produces a continuous current of heated air which envelops and is thereby effective in cooking the food in conjunction with the conduction heat source.

---

The present invention relates generally to an improved cooking unit, and more particularly to a cooking unit capable of cooking foods in an optimum short cooking interval while preserving and, in many instances, imparting noteworthy taste qualities to the cooked food.

Commensurate with the importance of efficiently cooking foods, there are available all types of cooking units in a variety which is too great to even classify; yet there is still a continuing effort to produce and provide improvements in this area. This effort is primarily directed to achieving certain objectives which are generally acknowledged as being desirable in cooking units and, while known cooking units do achieve one or more of these objectives to varying degrees of success, there is no known single cooking unit which effectively achieves a significant number of these objects.

For example, as generally understood, it is desirable in imparting favorable taste qualities to food, particularly meats, to minimize dehydration during cooking and thus the food surfaces are seared and charred, the latter being another recognized way of contributing to the taste of the food; heretofore, however, these cooking units which char the food surfaces have not achieved this result in a manner permitting efficient cooking of the internal portions of the food and thus the cooking interval of these units is of an unduly long duration.

Improvements to shorten the cooking interval, both in charcoaling and other types of cooking units, have characteristically involved the use of a more intense heat source and, as such, have not provided a completely satisfactory solution in that this approach invariably increases production costs and, more important, also increases the danger of burns to personnel working with or in the area adjacent the cooking unit. Further, even with efficient and modern ventilation, a cooking unit with an intense heat source produces discomfort during warm weather.

In summary, there is not only lack of satisfaction with known cooking units in the significant areas mentioned but also in less significant areas such as removal of smoke, uniformity of cooking performance and other such criteria. Accordingly, it is broadly an object of the present invention to provide an improved cooking unit overcoming the foregoing and other shortcomings of the prior art. Specifically, it is an object to provide a cooking unit which chars and sears the food surfaces to both impart desirable taste qualities and also to minimize dehydration and which achieves this result in an optimum cooking interval, as well as providing other noteworthy benefits and advantages including, but not necessarily limited to, being capable of efficient cooking under safe and comfortable conditions and with effective smoke removal.

A cooking unit demonstrating objects and advantages of the present invention includes a cooking chamber wherein the lower extent is founded by a conduction heat source, preferably in the specific form of an electrified grate, which, by definition, supports and is in actual physical contact with the food. The upper extent of the cooking chamber is bounded by a heating coil which, in cooperation with an exhaust blower located below the electrified grate, is operatively effective as a radiation and convection heat source and, as such cooks the internal portion of the food while the conduction heat source chars and sears the food surfaces.

The above brief description, as well as further objects, features and advantages of the present invention, will be more fully appreicated by reference to the following detailed description of presently preferred, but nevertheless illustrative, embodiments in accordance with the present invention, when taken in conjunction with the accompanying drawings, wherein:

FIG. 1 is a perspective view, with internal portions thereof shown in phantom perspective, of a cooking unit exemplary of the present invention;

FIG. 2 is an elevational view, in section taken on line 2—2 of FIG. 1, illustrating internal features thereof;

FIG. 3 is a partial sectional elevational view, on an enlarged scale, showing further details of the internal structural features thereof; and FIG. 4 is a schematic view of the electrical circuitry for the conduction heating elements as might be used in the foregoing or another embodiment of the heating unit hereof.

Reference is now made to the drawings wherein there is shown an improved cooking unit, generally designated 10, demonstrating features and advantages of the present invention. Cooking unit 10, as will be described in more detail herein, employs a unique combination of heat sources to efficiently cook food not only in optimum cooking intervals but also in a manner that preserves and imparts noteworthy taste qualities to the food. These combined sources of cooking heat include a conduction heat source, generally designated 12, which, by definition, has actual physical surface contact with the food being cooked and thus provides, because of the intensity of the heat capable of being applied by physical contact with the food surface, a charring of the surface and, in the case of meat, a searing of the contacted surface. The charred and seared food surface has a desirable charcoal flavor and also is effective in preventing the drainage of fluids from the food during the cooking interval.

Cooperating with the conduction heat source 12 is a combination radiation and convection heat source generally designated 14, which in the illustrated embodiment is in the specific form of a heating coil. Coil 14 functioning as a source of radiation and conduction cooking heat, by definition, occupies an elevated clearance position with respect to the food being cooked and is effective in cooking the food both by the radiation of heat flowing directly from it to the food and also by heating the surrounding air which is then drawn past the food to achieve cooking thereof.

Turning now to structural details, the illustrated embodiment of the cooking unit 10 includes a main lower rectangular housing 16 having an internal compartment 16a which has an upper rectangular opening 16b occupied by the previously noted conduction heat source 12. Specifically, the conduction heat source 12 may include a plurality of identically constructed tubular member 12a (only two of which, for clarity's sake, are designated in FIG. 1) which each have an upper cooking surface 12b on which, as clearly shown in FIG. 3, the food which may consist of a cut of meat M is physically supported during cooking. Although not shown, internally each element 12a includes an electrically energized resistance element which is raised to cooking temperature in response to the flowing of electricity therethrough, all as is well understood by those familiar with electrically energized heating elements. Pertinent to the present invention it should be noted that adjacent elements 12a of the conduction heat source 12 bound a clearance space 12c therebetween, the significance of which spaces 12c will soon be apparent.

Also in the illustrated cooking unit 10 there is included an upper housing unit 18 hingedly connected, as at 20, along one side of the lower housing 16 adjacent to the upper opening 16b thereof and movable about the hinges 20 between an open position, as illustrated in FIGS. 1, 2, and a position closed upon the lower housing 16, as illustrated in FIG. 3. The housing unit 18, when closed upon the housing unit 16, defines a cooking chamber C which, as clearly illustrated in FIG. 3, is bounded adjacent its lower extent by the conduction heat source 12 and along its upper extent by the heating coil 14 which serves as the radiation and convection heat source. Also, as clearly illustrated in FIG. 3, a typical food M during a typical cooking interval is situated within the cooking chamber C supported upon the conduction heat source 12 and in a clearance position beneath the radiation and conduction heat source 14.

Situated immediately below the electrified grate or conduction heat source 12 is a slidable drawer 22 having a front hand grip 22a thereon and slidably movable from an internal position within the lower housing 16, illustrated in full line in FIG. 2, into an accessible position extending laterally therefrom, illustrated in phantom perspective in FIG. 2. Spaced apart opposite guide rails 24, 26 appropriately secured, as at 28, to the side walls of the lower housing 16 support the drawer 22 during sliding movement thereof. Drawer 22 includes a bottom wall 22b having a central opening 22c therein and a drip pan construction 30 in a supported elevated position above the opening 22c. More particularly, the construction 30 includes a slanted or inclined upper panel 30a supported on circumferentially spaced supports 30b in a raised clearance position which provides openings 30c in communication with the previously noted central opening 22c. It should be noted that opening 22c is bounded by a circular upstanding lip 22d which cooperates with the side, front, rear and bottom walls of the drawer 22 to define a temporary storage compartment S for liquid drippings from the food M. That is, whatever drippings flow by gravity from the food M through the grate openings 12c fall onto the slanted walls 30a and flow into the compartment S. It should be further noted that the overhang of the slanted wall 30a is well beyond the lip 22d of the opening 22c so as to minimize and for all practical purposes prevent the flowing of this liquid through the openings 30c and into the opening 22c. Instead, as already noted, the tendency is for these liquid drippings to flow into the compartment S from which the same are periodically removed and the construction 30 conveniently cleaned by sliding the drawer 22 into its exposed position from the housing 16.

Completing the construction of the cooking unit 10 and constituting an essential element thereof is an exhaust blower 32, which may be conventionally constructed and be one of numerous models which are now readily commercially available. The blower 32 is supported on a bracket 34 at the base of the internal compartment 16a such that the inlet 32a thereof is immediately below and aligned with the opening 22c and the outlet 32b connected about an appropriate housing exit opening which in turn is ducted to atmosphere. As generally understood, the operation of the exhaust blower 32 is effective in providing the cooking unit 10 with a downdraft as one of its essential unique aspects and features. Specifically, and as may be best understood from a consideration of FIG. 3, the draft system, herein represented by the direction arrows designated D, significantly contributes to the effectiveness of the heating coil 14 as a convection heat source wherein it establishes a current of air moving in the direction D which is heated by the heating element 14, then drawn through the cooking chamber C past the food M, and through the grate openings 12c and the communicating openings 30c, 22c into the blower inlet 32a. As already noted, the interposed position of the slanted walls 30a between the conduction heat source 12 and the blower inlet 32a effectively separates and removes the liquid content from the gravity flowing materials from the food M and from the heated current of air D so that only substantially dry materials enter the exhaust blower inlet 32a or, in any event, materials in a condition which do not adversely affect the operation of the exhaust blower.

In the preferred embodiuent of the cooking unit 10 hereof, use is advantageously made of a screen 34 appropriately mounted along the upper wall of the upper housing unit 18 to serve, in a generally understood manner, as a heat radiation barrier which intensifies and directs the radiation of the heat from the heating coil 14 in a downward direction into the cooking chamber C. Screen 34, to some extent, also helps maintain the exposed outer surface 18a of the unit 18 at a safe temperature at which it is just warm to the touch but not hot enough to cause serious burning or injury to any personnel inadvertently touching this surface. The screen 34, however, is not necessary for this function.

Primarily, the surface 18a is maintained in a safe condition by the draft system D provided by the exhaust blower 32 in that the heated current of air by being drawn through the cooking chamber C is necessarily removed from the vicinity of the surface 18a. It should also be noted that the draft system D provides another significant benefit of removing any smoke that invariably results from the searing of the food surfaces in contact with the conduction heat source 12. The foregoing, of course, is in addition to the draft system D making the heating coil 14 an effective convection heat source during which a continuous fresh supply of air is drawn through the entry port 18b or some other appropriate opening, next drawn past the red hot heating coil 14 so that the temperature of the current of air is raised sufficiently to cause cooking of the food and, finally, is drawn in close proximity to and thereby envelops the food M within the cooking chamber C so that there is an effective transfer of heat from the moving heated air D to the food M. Moreover, experiments have further shown that the cooking of the food by convection, as just described, can be accurately controlled since the volume and temperature of the heated air can in turn be accurately controlled by temperature controls for the heating coil 14 and by air movement controls for the exhaust blower 32. This, in turn, enables consistency in the cooking performance of the cooking unit 10 for any specified thickness of cut of meat M and cooking interval of a specified duration and in another significant advantage and contribution of the draft system D.

Although it should be readily apparent that conventional circuitry can readliy be applied to energize the conduction heat source 12 and the heating coil 14 to cooking temperatures, for completeness sake, an exemplary embodiment of such circuitry is illustrated in FIG. 4 and will now be generally described. With a view to facilitating the repair of any malfunctioning heat heating element 12a of the conduction heat source 12, it is advantageous to construct the plural heating elements 12a in independent functioning sections or banks 12d of heating elements, four of which are shown in FIG. 4. Each of the sections or banks 12d, consisting of one-fourth of the number of heating elements 12a in the embodiment depicted in FIG. 4, is separately removable and has an electrical connection via conductors 36 to a source of electrical energy E which, of course, may be an ordinary wall socket. As may be understood by reference to FIG. 1 in conjunction with FIG. 4, each of the banks 12d may have a conventional variable resistance control 38 appropriately electrically connected in its energization circuit, which control is effective to provide a wide range of adjustments in the cooking temperatures attained by the cooking elements 12a. Although not shown in FIG. 4, the energization circuit for the heating coil 14 is also to be understood to be conventional and advantageously may be embodied as a branch circuit to the main circuit of FIG. 4, being electrically connected thereto via the conductor 36a.

From the foregoing description it should be readily appreciated that the cooking unit 10 hereof advantageously and in a unique manner employs three types of heat transfer, namely, a heat source 14 which achieves heat transfer by radiation and by convection and a heat source 12 which achieves heat transfer by conduction. These are used to efficiently cook foods in an operative position within the cooking chamber C supported on the conduction heating source 12 and located directly beneath the radiation and convection heat source 14. The cooking of the food M not only is achieved in a nominal time, but the searing of the food surface in contact with the conduction heat elements 12a effectively charcoals the food and thereby greatly adds to the taste qualities of the cooked food. Further, the seared lower surface minimize the loss of fluids from the food M during the cooking interval.

As generally understood, the cooking of the food with minimum loss of fluids therefrom, or in other words without dehydration, is highly desirable and also contributes greatly to the taste of the cooked food. Naturally, during a typical cooking interval the food M should be turned at the appropriate time so that both food surfaces are seared and imparted with a charcoal flavor.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A cooking unit comprising a convection and radiation heat source, a cooking chamber located adjacent said convection and radiation heat source, a food support member bounding the lower extent of said cooking chamber, said convection and radiation heat source, cooking chamber and food support member being arranged in vertical relation, a draft system including an exhaust blower operatively effective to draw a current of air heated by said convection and radiation source through said cooking chamber, and means located in an interposed position between said food support member and said exhaust blower operatively effective to remove the liquid content from said current of heated air prior to the entry thereof into said exhaust blower, said food support member having openings therein to permit the passage therethrough of said current of heated air and having conduction-heating surfaces bounding said openings effective to sear the food surface in contact therewith so as to minimize the loss of fluids from said food while said convection and radiation heat source cooks the internal portion of said food.

2. A cooking unit comprising means defining a cooking chamber, a convection and radiation heat source bounding the upper extent of said cooking chamber, a conduction heat source bounding the lower extent of said cooking chamber serving as a support for the food being cooked in said cooking chamber, said conduction heat source comprising plural cooking surfaces, each adjacent pair of which bounds a clearance space through which there is both gravity flow of fluids from the food being cooked during each cooking interval and the passage of a current of heated air in close proximity to said food to cause cooking thereof, a draft-creating means located adjacent the conduction heat source including an exhaust blower operatively effective to draw a current of air heated by said radiation and convection heat source through said cooking chamber, and separating means located in an interposed position between said conduction heat source and said exhaust blower operatively effective to separate said gravity flowing fluids from said current of heated air.

References Cited

UNITED STATES PATENTS

| 2,214,630 | 9/1940 | Wheeler. |
| 2,243,993 | 6/1941 | Watson _____ 99—402 XR |
| 3,246,690 | 4/1966 | Fry _____ 219—400 |
| 3,252,407 | 5/1966 | Buerki _____ 99—446 |

FOREIGN PATENTS 628,108 10/1940 Great Britain.

WALTER A. SCHEEL, Primary Examiner
A. O. HENDERSON, Assistant Examiner

U.S. Cl. X.R.

99—400, 450